Figure 5:
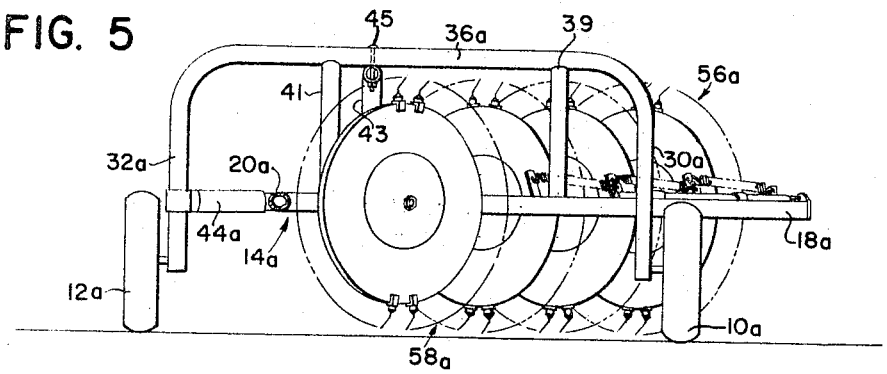

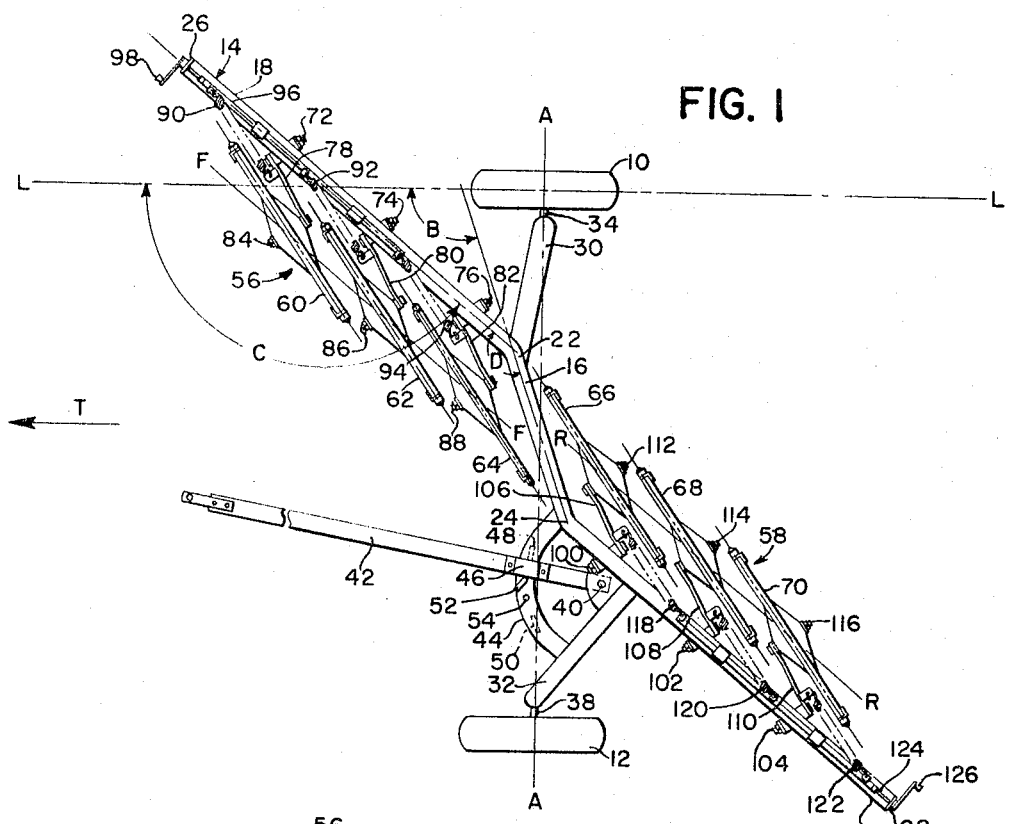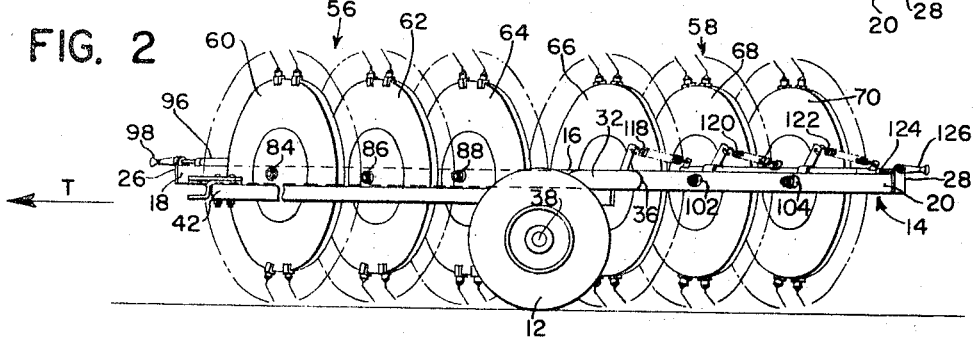

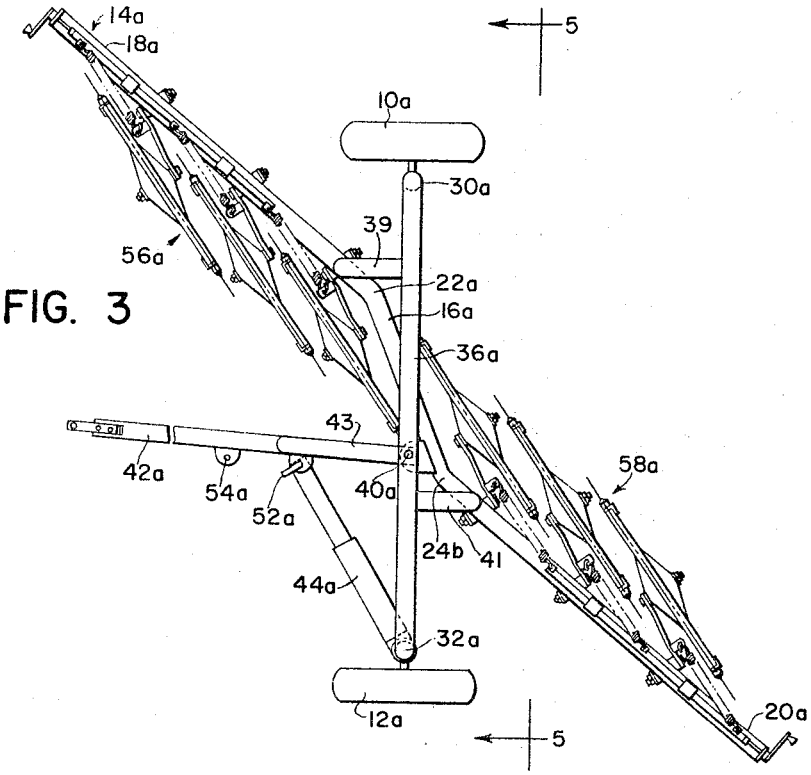
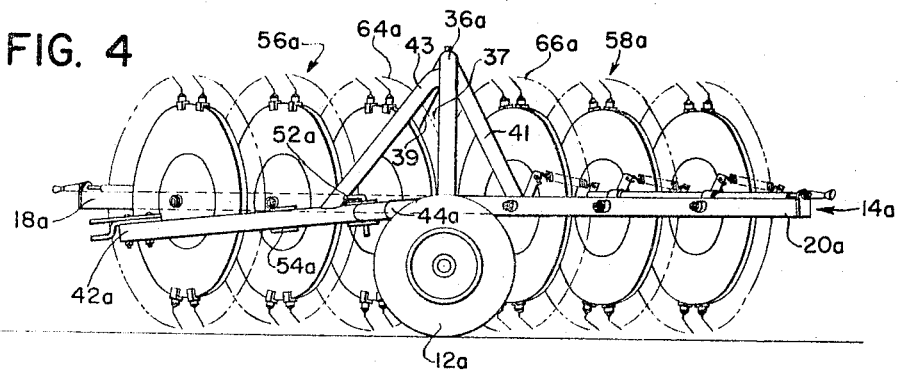
INVENTORS
G. R. SUTHERLAND &
A. E. BREED

May 23, 1967  G. R. SUTHERLAND ET AL  3,320,735
ROTARY SIDE-DELIVERY RAKE
Filed Dec. 11, 1964  3 Sheets-Sheet 3

INVENTORS
G. R. SUTHERLAND &
A. E. BREED

United States Patent Office 3,320,735
Patented May 23, 1967

3,320,735
ROTARY SIDE-DELIVERY RAKE
Gail R. Sutherland, Des Moines, and Arie E. Breed, Ottumwa, Iowa, assignors to Deere & Company, Moline, Ill., a corporation of Delaware
Filed Dec. 11, 1964, Ser. No. 417,633
14 Claims. (Cl. 56—377)

This invention relates to a side-delivery rake of the rotary-raking-wheel type in which a mobile frame carries a plurality of individual, tined rotary raking wheels that turn by contact with the ground or hay as the frame advances.

It is typical of these rakes that the raking wheels are arranged in overlapping or echelon fashion, a construction well known to those versed in the art. In early designs of rakes of this type, the supporting frames were cumbersome and this in turn led to complications in the individual mountings of the raking wheels. Subsequent developments eliminated some of the mass from earlier frames but were characterized primarily by arched frame constructions necessitated by an apparent need to locate the frame members above the peripheries of the relatively large raking wheels. Later attemps to solve this problem—that is, elimination of high arches—led to the interposition of frame members between overlapping wheels, somewhat at the expense of increasing the spacing between the wheels and further resulting in diverse mounting means, because the intervening portions had to assume rather incongruous relationships to other parts of the frame; e.g., the axle supports and draft tongue.

According to the present invention, a simplified frame is provided, and one in which the raking wheels are easily arranged respectively at opposite sides of a fore-and-aft elongated, generally horizontal, substantially Z-shaped main element. The front and rear echelons of raking wheels overlap at the intermediate section or "bar" of the Z, thus enabling the overlap between the rearwardmost wheel of the forward echelon to assume a proper relationship to the forwardmost wheel of the rear echelon. This enables the use of a frame in which the main elongated part is capable of lying approximately in the same generally horizontal plane. It is a further object of the invention to take advantage of the Z-shape of the frame so as to mount the rear echelon wheels on leading or forwardly extending arms and to mount the front echelon wheels on trailing or rearwardly extending arms, this enabling the front and rear wheels to more closely approach an oblique alinement.

Further objects of the invention reside in exploiting the basic design in the form of other modifications in which the axle structure for the main supporting wheels is properly related to the Z-shaped frame element. In one form of the invention, an arched axle is used but the arch is relatively low because it lies in the "valley" that occurs at the upper rear portion of the periphery of the rearwardmost front echelon wheel and the upper forward portion of the periphery of the forwardmost rear echelon wheel. Frame structures according to any of the several forms of the invention may be simply and economically constructed and furnish improvements over prior rake structures in both function and appearance.

The foregoing and other important objects and desirable features inherent in and encompassed by the invention will become apparent as preferred embodiments thereof are disclosed in detail in the ensuing description and accompanying sheets of drawings, the figures of which are described below.

Figure 6:
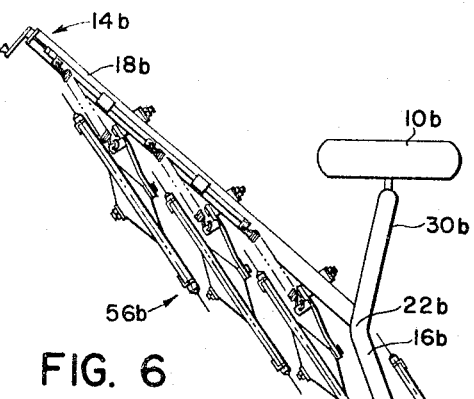

FIG. 1 is a plan view of one form of rake embodying the Z-shaped main element.
FIG. 2 is a side elevation of the rake of FIG. 1.
FIG. 3 is a plan view of another form of rake.
FIG. 4 is a side elevation of the rake of FIG. 3.
FIG. 5 is a rear view, partly in section, as seen along the line 5—5 of FIG. 3.
FIG. 6 is a plan view of still another form of rake.

The rake shown in FIG. 1 has right- and left-hand support wheels 10 and 12, spaced apart transversely to the line of advance, the direction of travel being indicated by the arrow T. A line L—L, parallel to the line of advance, passes through the right-hand wheel 10 (in the drawing) for purposes to be made clear hereinafter. Supported between the wheels 10 and 12 is a frame including a main fore-and-aft elongated, generally horizontal, substantially Z-shaped element 14 which is disposed, in the main, diagonal to the line of advance. This element is made up of a relatively short diagonal intermediate section 16, an elongated right-hand forward leg 18 and a similarly elongated left-hand rearward leg 20.

In this form of the invention, the element 14 has its section and legs of preferably integral construction and thus may comprise a one-piece tube formed to accomplish the Z-shaped configuration. The section 16 is relatively short, when compared to either of the legs 18 and 20, which are here shown as symmettrical at opposite sides of the wheel axis A—A, and, specifically, the section 16 intersects the wheel axis midway between the wheels 10 and 12, or substantially so. The section has right and left end portions 22 and 24, respectively, and the forward leg 18 extends rightwardly or outwardly and forwardly from the junction 22 to a terminal end 26 ahead of and to the right of the right-hand supporting wheel 10; the rearward leg 20 extends from the section portion 24 outwardly or leftwardly to the rear and has its rear terminal end 28 to the left of and behind the supporting wheel 12.

The angle of the section 16 relative to the axis A—A is not appreciably great. As related to the line L—L which, for all practical purposes, may be taken as parallel to the line of advance, the center line extended to the section 16 forms an angle B. The angle between the section 16 and the front leg 18 is obtuse and is represented here by the angle D. Because of the obtuse angle at D, the angle C that the center line of the leg 18 makes with the line L—L is greater than the angle B between the center line of the section 16 and the line L—L. Since the legs 18 and 20 are parallel, it follows that the leg 20 is joined at 24 to the section 16 in such manner as to form an obtuse angle equal to the angle D.

The configuration of the frame element 14 enables it to be easily supported substantially midway between the support wheels 10 and 12, and support of the frame element is accomplished by transverse support or axle means, here including right- and left-hand axle parts 30 and 32, respectively. The right-hand axle part is joined to the portion 22 at the right-hand end of the section 16 and, since this portion is forwardly of the axis A—A, the axle part 30 extends rearwardly and rightwardly to a point at which it is provided with a spindle 34 for appropriately journaling the support wheel 10. The left-hand axle part 32 is connected to the element 14 at a rearwardly disposed position. Specifically, this leg is rigidly connected to the rearward leg 20, as at 36, which point is appreciably behind the wheel axis A—A. Consequently, the axle part 32 extends forwardly and outwardly to the left to a point at which it is provided with a spindle 38 which journals the left-hand wheel 12.

The angular relationship effected at the junction 36 between the left-hand axle part 32 and rearward leg 20 is fitted with a mounting plate including a pivot 40 from which a draft tongue 42 extends forwardly. An arcuate member 44 is rigidly connected at opposite ends respectively to the axle part 32 and to the portion 24 of the section 16, and the draft tongue 42 has thereon a strap 46 which guidingly supports the draft tongue for lateral swinging on the arcuate member 44 between limits established by right-hand and left-hand stops 48 and 50, respectively. The tongue 42 is held in either of these positions by a removable pin 52 which is removable from the position shown and which is reinsertable in a second opening 54 just to the right of the stop 50. Swingable draft tongues, of the general nature illustrated and described, are of course well known to those versed in the art. However, the mounting of the tongue in this particular case, especially by means of the brace or member 44 between the axle part 32 and the element 14, is novel.

The rake here includes front and rear echelons of rotary raking wheels, designated generally by the numerals 56 and 58 respectively. The front echelon includes rotary raking wheels, which may be of conventional construction, 60, 62 and 64. These are arranged in oblique overlapping relationship, an arrangement which is of course well known. The fore-and-aft and lateral offset of these wheels are such that their centers lie, in the instance shown, on a line F—F which is here parallel to the front element leg 18. A line spaced below the line F—F and drawn on the ground will include the points of tangency of the tips of the tines of the wheels to the ground. Since, as stated, the wheels may be of conventional construction, they are not described in detail, but the overall picture thereof will be clear from the drawings. The wheels are of course rotated as the rake advances, which is typical of rakes of this nature.

The rear wheel echelon 58 includes similar wheels 66, 68 and 70. The centers of these wheels lie along a line R—R which is of course parallel to the rear leg 20.

It is characteristic of this construction that the wheels in the front echelon 56 lie forwardly of the section 16 and to the left of the right-hand leg 18, whereas the wheels in the rear echelon 58 lie to the rear of the section 16 and to the right of the rearward leg 20. It is further seen that the rearwardmost wheel 64 of the front echelon lies in overlapping relationship to the forwardmost wheel 66 of the rear echelon, and that this overlap and spacing approximates that between the wheels of each echelon. This results from the angular disposition of the section 16 which, although it lies between the wheels 62 and 66, does not materially affect the lateral offset or overlap.

It is a further feature of the invention to provide improved individual mounting means for the raking wheels. To this end, then, the forward leg 18 is provided with a plurality of pivots 72, 74 and 76, offset forwardly from the centers of the respective wheels 60, 62 and 64. The spacing and offsets are uniform. The pivots just described respectively mount the forward ends of rearwardly extending or trailing arms 78, 80 and 82, the rear ends of which arms respectively journal the wheels 60, 62 and 64 respectively at 84, 86 and 88. The arms may be in the form of bell cranks, individually spring-suspended as at 90, 92 and 94. The springs in turn are shown as being connected to an adjusting rod 96, rotatably supported on the forward leg 18 and having a crank 98 at its forward end for adjusting the elevation of the wheels relative to the ground, leaving the wheels of course capable of rising and falling individually.

The wheel structure and mounting in the rear echelon 58 are symmetrical as respects those just described, and the rearward leg 20 has uniformly spaced apart lengthwise thereof a plurality of pivots 100, 102 and 104 which respectively mount forwardly extending arms 106, 108 and 110, the forward ends of which respectively carry spindles 112, 114 and 116 for the wheels 66, 68 and 70. Spring suspension means of the type described above for the front echelon are utilized for the rear echelon wheels, as shown at 118, 120 and 122. Here again, the suspensions may be interconnected, as by a control rod 124 journaled on the rearward leg 20 and operated by a rearwardly disposed crank 126, the function of which is the same as that described above for the front echelon control 96–98.

The trailing disposition of the front echelon wheel-supporting arms 78, 80 and 82 contributes to the disposition of the front echelon in closely spaced relation ahead of the element intermediate section 16, as is added to of course by the forward or leading disposition of the rear echelon wheel-supporting arms 106, 108 and 110. This enables symmerical construction both rearwardly of and forwardly of the center of the element as represented by the midportion of the section 16.

The general similarity of that form of invention shown in FIGS. 3, 4 and 5 to that already described will be readily seen, and consequently only a few of the basic reference characters will be employed, repeating those of FIGS. 1 and 2 and adding the suffix $a$. Thus, the main beam 14$a$ is of Z-shape configuration, having the intermediate section 16$a$ and the front and rear legs 18$a$ and 20$a$, which respectively carry the front and rear wheel echelons 56$a$ and 58$a$. Since the details of these are identical to those already described, repetition will be avoided. The axle structure in this case is of arched nature (FIG. 5), having opposite right- and left-hand legs 30$a$ and 32$a$ joined by a transverse arch 36$a$. It is characteristic of this construction that the arch 36$a$ is relatively low, since it crosses the wheel echelons in the "valley," as at 37, between the upper rear portion of the periphery of the rearwardmost wheel 64$a$ of the front echelon and the upward forward portion of the periphery of the forewardmost wheel 66$a$ of the rear echelon. The arch 30$a$–32$a$–36$a$ may be of one-piece construction, supporting the beam 14$a$ therebelow by means of right- and left-hand braces 39 and 41. The brace 39 is secured, as by welding, to a right-hand portion of the arch 36$a$ and extends forwardly and downwardly and is rigidly connected, as by welding, to a portion of the front leg 18$a$ just forwardly of the junction 22$a$ between the section 16$a$ and the leg 18$a$. The other brace 41 is similarly connected but symmetrically arranged relative to a left-hand portion of the arch 36$a$ and a forward portion of the rearward leg 30$a$.

The draft tongue 42$a$ is pivoted at its rear end to a bracket 40$a$ on the element 14$a$ and extends forwardly as before. In this case, the tongue includes an additional brace 43, pivotally connected at 45 to a portion of the arch 36$a$ directly above the bracket 40$a$ and extending downwardly and forwardly for rigid connection to an intermediate portion of the draft tongue 42$a$. Lateral swinging or positioning of the tongue 42$a$ about the pivots just referred to is achieved selectively by means of a telescopic connection 44$a$, one end of which is connected to the axle leg 32$a$ and the other end of which is selectively connectible in the position shown or in a second position by means of an opening 54$a$ and cooperative locking pin 52$a$.

Here, as in FIGS. 1 and 2, the arrangement of the echelons 56$a$ and 58$a$ is carried out relative to the main beam as well as relative to the axle structure. Other characteristics will be readily seen without further description.

What has been said above relative to FIGS. 1 and 2 and 3–5 is true also of the third form of the invention shown in FIG. 6, wherein common reference characters, supplemented by the suffix "$b$" are employed. It will be seen, thus, that the main beam 14$b$, having the intermediate section 16$b$ and front and rear legs 18$b$ and 20$b$ is carried by a transverse axle structure 30$b$–32$b$. In this case, however, the section 16$b$ is included as in integral part of the axle parts 30$b$ and 32$b$. Nevertheless, the same relationship of the section portions 22$b$ and 24$b$ to the legs 18$b$ and 20$b$, respectively, is obtained. This is true also of the arrangement of the front and rear wheel echelons 56$b$ and 58$b$, featuring again, as before, the trailing wheel-supporting arms for the wheels in the front echelon and the leading wheel-supporting arms in the rear echelon. The draft tongue 42$b$ is carried by a rear pivot 40b and extends across the left-hand axle part 32b, which is here used as a draft tongue guide, being equipped with right- and left-hand stops 48b and 50b between which two positions of the tongue are obtainable by means of the pin 52b and second opening 54b. Other than that, this construction is identical to FIGS. 1 and 2 and further description is deemed to be unnecessary.

All three forms of the invention have the same basic characteristics, featuring the Z-shaped longitudinal element, the front and rear wheel echelons and the trailing supports for the wheels in the front echelon and the leading wheel supports for the wheels in the rear echelon.

Features and advantages other than those categorically enumerated will readily occur to those versed in the art, as will further modifications of the invention as disclosed, all of which may be achieved without departure from the spirit and scope of the invention.

The embodiments of the invention in which an exclusive property or privilege is claimed are defined as follows:

1. A side-delivery rake of the rotary-raking-wheel type adapted to advance over a field, comprising: right- and left-hand support wheels spaced apart transversely to the line of advance; a frame including a fore-and-aft elongated, generally horizontal, substantially Z-shaped element having a relatively short section diagonal to the line of advance and disposed intermediate and in substantial transverse alinement with the wheels and having right- and left-hand portions spaced respectively laterally inwardly of the wheels, an elongated right-hand forward leg rigid with and extending forwardly and rightwardly from said right-hand portion, at an obtuse angle to said intermediate section, to a terminal front end ahead of and rightwardly of the right-hand wheel, and an elongated left-hand rearward leg rigid with and extending rearwardly and leftwardly from said left-hand portion, at a like obtuse angle to said section, to a terminal rear end leftwardly and to the rear of the left-hand wheel; front and rear echelons of obliquely disposed rotary raking wheels arranged respectively along the left and right sides of the forward and rearward legs and respectively ahead of and behind the intermediate section so that the rearwardmost front echelon wheel and the forwardmost rear echelon wheel lie in overlapping relation with said section between them; a plurality of individual means rotatably supporting the raking wheels on said element; and transverse support means rigid with said element and extending respectively to and carrying the support wheels.

2. The invention defined in claim 1, in which: the means rotatably supporting the raking wheels on said element includes a plurality of rear pivots on and spaced apart lengthwise of the rearward leg respectively in rearwardly offset relation to the centers of rotation of said rear echelon wheels, and a like plurality of forwardly extending rear arms carried respectively at their rear ends by said pivots and having their front ends respectively journaling said rear echelon wheels at their centers; and a plurality of forward pivots on and spaced apart lengthwise of said forward leg respectively in forwardly offset relation to the centers of rotation of the front echelon wheels, and a like plurality of rearwardly extending forward arms carried respectively at their front ends by said forward pivots and having their rear ends respectively journaling said front echelon wheels at their centers.

3. The invention defined in claim 1, in which: said element is of integral construction end-to-end, and the transverse support means includes a right axle part rigid with and extending from the right side of said element to and journaling the right-hand support wheel and a left axle part rigid with and extending from the left side of the element to and journaling the left-hand support wheel.

4. The invention defined in claim 1, in which: the transverse support means includes right- and left-hand axle parts integral with the intermediate section of the element and extending respectively outwardly from the right- and left-hand portions of said section respectively to and journaling said right- and left-hand support wheels, and said forward and rearward legs are rigidly joined to said section respectively at said right- and left-hand portions thereof.

5. The invention defined in claim 1, in which: the transverse support means is a one-piece cross part including said intermediate section and right- and left-hand axle parts extending respectively outwardly to and journaling said right- and left-hand support wheels, and said forward and rearward legs are rigidly joined to said section respectively at said right- and left-hand portions thereof.

6. The invention defined in claim 1, in which: the transverse support means is an arched axle having right- and left-hand ends respectively journaling the right- and left-hand support wheels and a transverse arch extending over the intermediate section in the area of the overlap between the forwardmost raking wheel of the rear echelon and the rearwardmost raking wheel of the rear echelon.

7. The invention defined in claim 6, including: right- and left-hand braces rigidly connected to the arch and extending respectively forwardly and rearwardly therefrom and rigidly connected respectively to the forward and rearward legs.

8. The invention defined in claim 7, including: a draft tongue connected at its rear end to the intermediate section to the left of the forward leg, and a further brace connected to the arch and extending downwardly and forwardly to and connected with the tongue.

9. The invention defined in claim 6, in which: the arch lies in the valley that is formed by the upper rearward periphery of the rearwardmost front echelon wheel and the upper forward periphery of the forwardmost rear echelon wheel.

10. The invention defined in claim 1, in which: the support wheels are coaxial, the right- and left-hand portions of the intermediate section lie respectively ahead of and behind the axis of said support wheels, and the transverse support means includes right- and left-hand axle parts rigid with said section and extending oppositely outwardly and respectively rearwardly and forwardly from said section to the support wheels.

11. The invention defined in claim 1, in which: the support wheels are coaxial, the right- and left-hand portions of the intermediate section lie respectively ahead of and behind the axis of said support wheels, and the transverse support means includes right- and left-hand axle parts rigid with the element and extending oppositely outwardly and respectively rearwardly and forwardly from said section to the support wheels.

12. The invention defined in claim 1, in which: the support wheels are coaxial, the right- and left-hand portions of the intermediate section lie respectively ahead of and behind the axis of said support wheels, the transverse support means includes a right-hand axle part extending outwardly and rearwardly from the right-hand portion of said section to and journaling the right-hand support wheel and a left-hand axle part journaling the left-hand support wheel and extending inwardly and rearwardly to and joined with the rearward leg rearwardly of said left-hand portion of said section, and a draft tongue extends forwardly from the junction of said left-hand axle part and said rearward leg.

13. The invention defined in claim 12, including: a draft tongue support engaging the draft tongue and extending between and connected to said left-hand axle part and said section at said left-hand portion.

14. A side-delivery rake of the rotary-raking-wheel type adapted to advance over a field, comprising: right- and left-hand support wheels spaced apart transversely to the line of advance; a frame including transverse axle structure disposed between and carried by the wheels and having right- and left-hand portions respectively proximate to said wheels, a right-hand front leg connected to said structure at said right-hand portion and extending diagonally forwardly and rightwardly, and a left-hand rear leg connected to said structure at said left-hand portion and extending diagonally rearwardly and leftwardly, said legs lying in fore-and-aft offset parallelism; and rotary raking means including a front echelon of rotary raking wheels carried by the right-hand front leg in substantial diagonal alinement with a similar rear echelon of rotary raking wheels carried by the left-hand rear leg.

References Cited by the Examiner

UNITED STATES PATENTS

| | | | |
|---|---|---|---|
| 3,006,132 | 10/1961 | Van Der Lely et al. | 56—377 X |
| 3,015,202 | 2/1962 | Van Der Lely et al. | 56—377 |
| 3,167,900 | 2/1965 | Wood | 56—377 |

ABRAHAM G. STONE, *Primary Examiner.*

P. A. RAZZANO, *Assistant Examiner.*